(12) United States Patent
Stavrou et al.

(10) Patent No.: US 9,374,542 B2
(45) Date of Patent: Jun. 21, 2016

(54) IMAGE SIGNAL PROCESSOR WITH A BLOCK CHECKING CIRCUIT

(71) Applicant: Intel Corporation, Santa Clara, CA (US)

(72) Inventors: Kyriakos Stavrou, Barcelona (ES); Pedro Marcuello, Barcelona (ES); Grigorios Magklis, Barcelona (ES); Javier Carretero Casado, Barcelona (ES); Juan Fernandez, Barcelona (ES); Carlos Madriles, Barcelona (ES); Daniel Ortega, Barcelona (ES); Demos Pavlou, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 14/228,684

(22) Filed: Mar. 28, 2014

(65) Prior Publication Data

US 2015/0281602 A1    Oct. 1, 2015

(51) Int. Cl.
*H04N 5/357* (2011.01)
*H04N 5/378* (2011.01)
*H04N 5/232* (2006.01)

(52) U.S. Cl.
CPC .......... *H04N 5/357* (2013.01); *H04N 5/23229* (2013.01); *H04N 5/378* (2013.01)

(58) Field of Classification Search
CPC ..... H04N 5/357; H04N 5/378; G06K 9/4642; G06K 9/4647
See application file for complete search history.

(56) References Cited

U.S. PATENT DOCUMENTS

| 2005/0058341 | A1* | 3/2005 | Maruoka | 382/167 |
| 2007/0103601 | A1* | 5/2007 | Izumi | 348/687 |
| 2013/0050469 | A1* | 2/2013 | Takezawa et al. | 348/92 |

\* cited by examiner

*Primary Examiner* — Mekonnen Dagnew
(74) *Attorney, Agent, or Firm* — Nicholson De Vos Webster & Elliot, LLP

(57) ABSTRACT

An image signal processor is described. The image signal processor includes a block checking circuit. The block checking circuit comprises comparison circuitry to compare a block of luminous pixel values against respective blocks of luminous pixel values that are processed by the image signal processor after the block of luminous pixel values. The block checking circuitry further comprises circuitry to record an entry in a table if one of the blocks of respective luminous pixel values match the block of luminous pixel values. The image signal processor is to store an image signal processing resultant of the block of luminous pixel values and present the stored resultant as a respective resultant for the one of the blocks of respective luminous pixel values if the one of the blocks of respective luminous pixel values matches the block of pixel values.

20 Claims, 13 Drawing Sheets

IMAGE SIGNAL PROCESSOR WITH A BLOCK CHECKING CIRCUIT

FIELD OF THE INVENTION

The field of invention pertains generally to graphics processing, and more specifically to an image signal processor with a block checking circuit.

BACKGROUND

Figure 1:
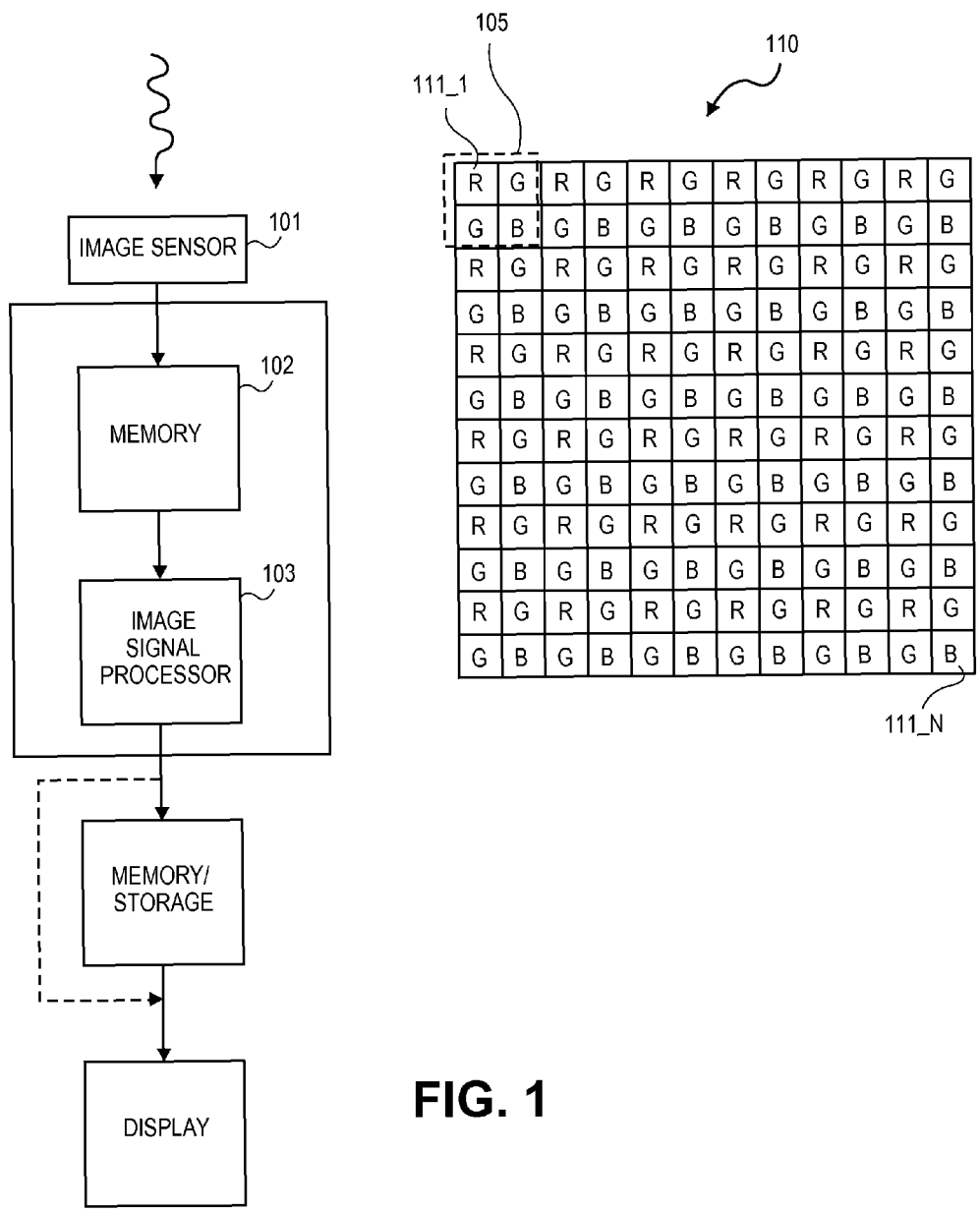

FIG. 1 shows a prior art system 100 for processing images captured by an image sensor. As is known in the art, the image sensor 101 is typically a pixelated light sensitive device (such as an array of CMOS image sensors). Inset 110 shows a simplistic depiction of a "frame" of information that is captured by the image sensor 100 and stored in memory 102. Each pixel 111_1 through 111_N of the image includes a luminosity value for a particular color (e.g., red (R), green (G), blue (B) or other color). In a common situation, the underlying photoelement in the sensor responds to light intensity of a particular color.

According to various types of sensors, each color specific pixel is effected by placing a colored filter before the pixel's photoelement. For example, red color filters are placed before the photoelements of red pixels, blue color filters are placed before the photoelements of blue pixels, etc. Again, even though red, green and blue are used as primary examples, they are only examples and other colors may be used (e.g., red/blue/clear; yellow/magenta/cyan; dark red/light red/dark blue/light blue/dark green/light green). Additionally the particular RGB pixel pattern of FIG. 1 is only exemplary (other pixel patterns are possible).

"Blocks" of pixels are then read from memory 102 and processed by an image signal processor 103. A block is a contiguous group of pixels, typically in the shape of a square (e.g. block 105 of FIG. 5). For example, the image signal processor 103 may accept 2 pixel×2 pixel (or larger) blocks as units of input information. Again, each "pixel" of a block contains a luminosity value for that pixel (a measurement of its brightness/intensity). The RGB pixel pattern of the frame dictates whether the luminosity value is understood to correspond to a red, green or blue luminosity value.

The image signal processor 103 then performs various computations on the block to generate a signal for display on a display 104. In many implementations the signal is stored in a memory (e.g., a system memory before it is displayed) prior to being displayed and may even be stored to memory without being displayed. The computations may include but are not limited to the following: demosaicing, noise reduction, image sharpening, chromatic aberration correction, geometric distortion correction, dead pixel correction and gamma correction.

The image signal processor 103 is typically implemented with a pipeline (software, hardware or both) that concurrently processes different blocks. For example, while a first block is being processed by a demosaicing stage, another block may be processed by a noise reduction stage. Blocks are read in succession from memory 102 into, e.g., a first stage of the image signal processor's pipeline. Upon the first stage of the pipeline finishing a first block, a next block from memory is received. Thus, the second stage of the pipeline processes the first block and the first stage of the pipeline processes the second block. The process continues until all blocks of the frame are fully processed by the pipeline.

FIGURES

Figure 2:
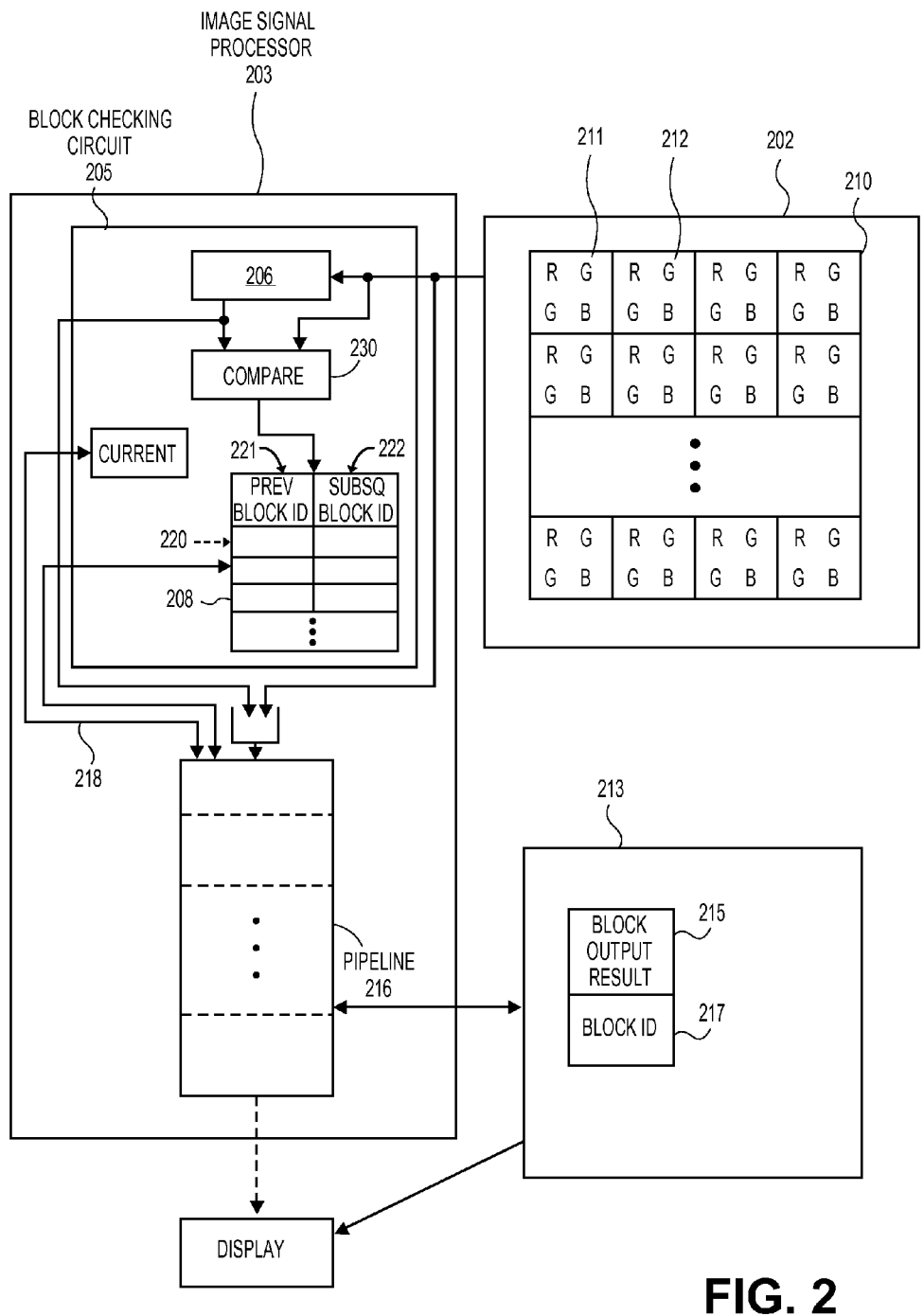
Figure 3A:
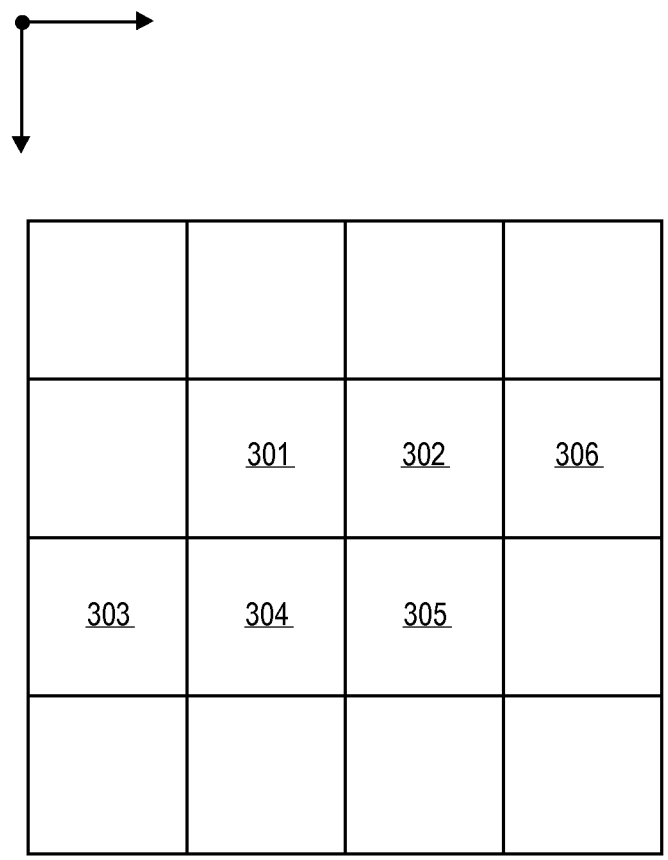
Figure 3B:
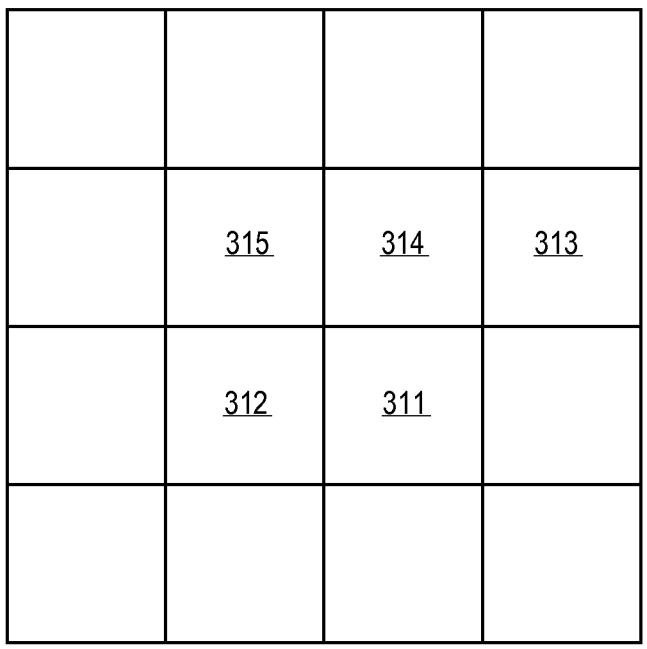
Figure 3B:
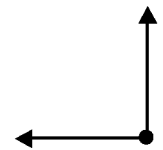
Figure 4:
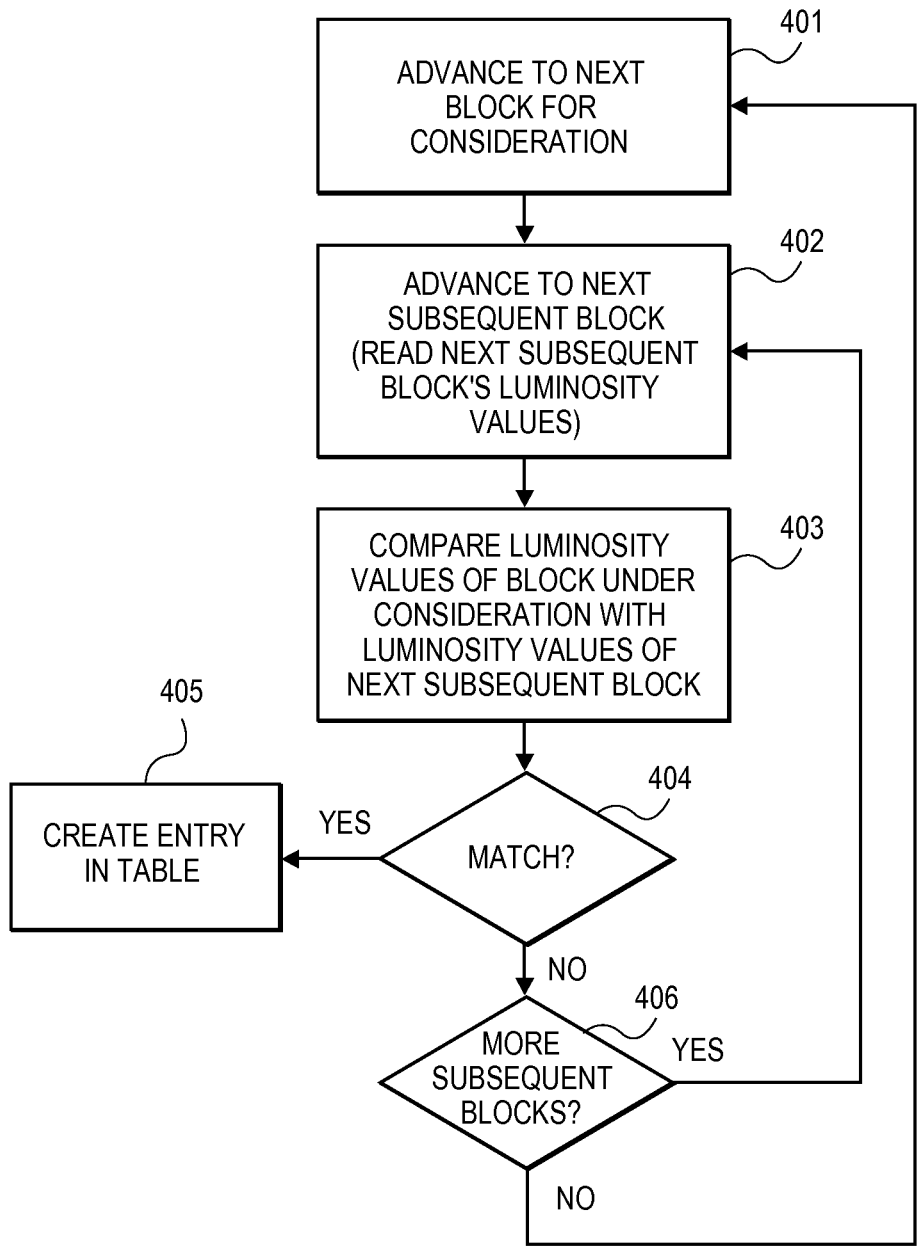
Figure 5:
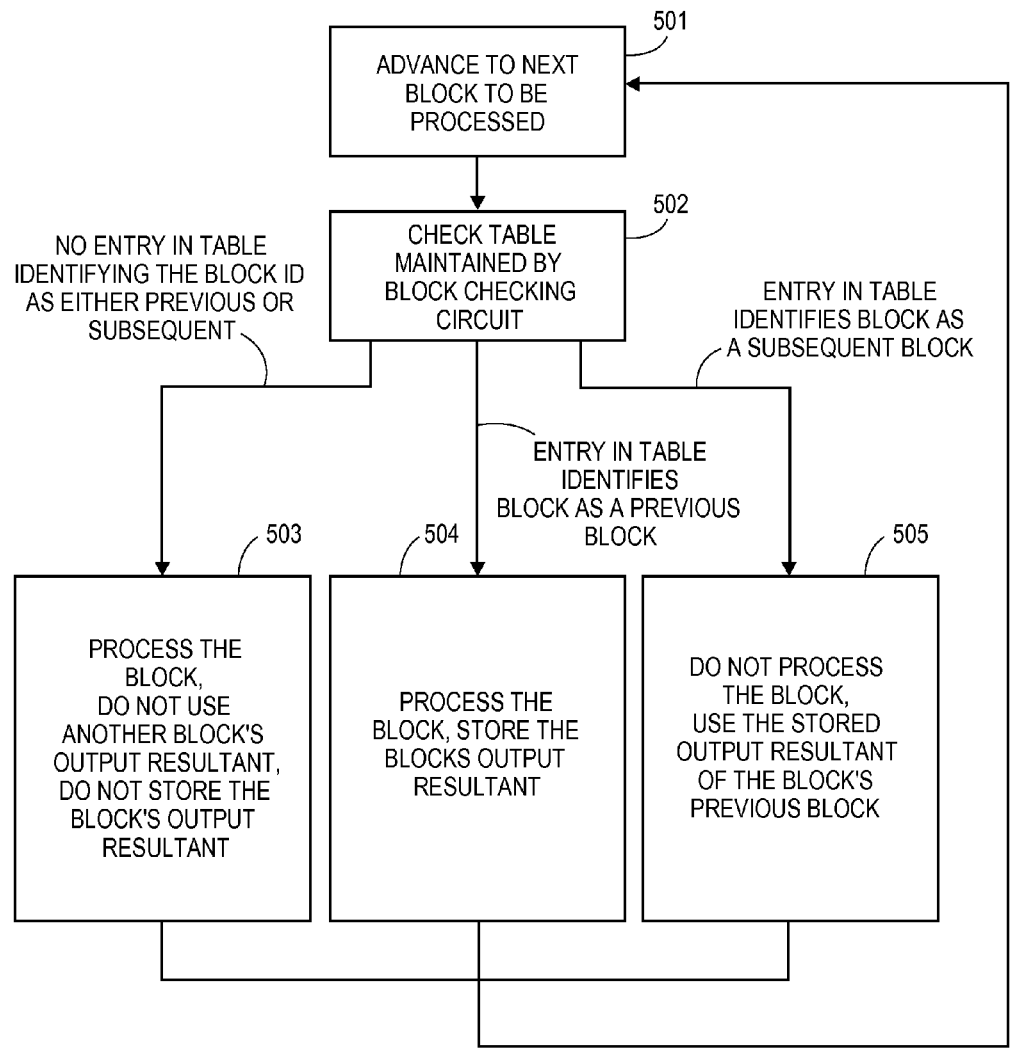
Figure 6:
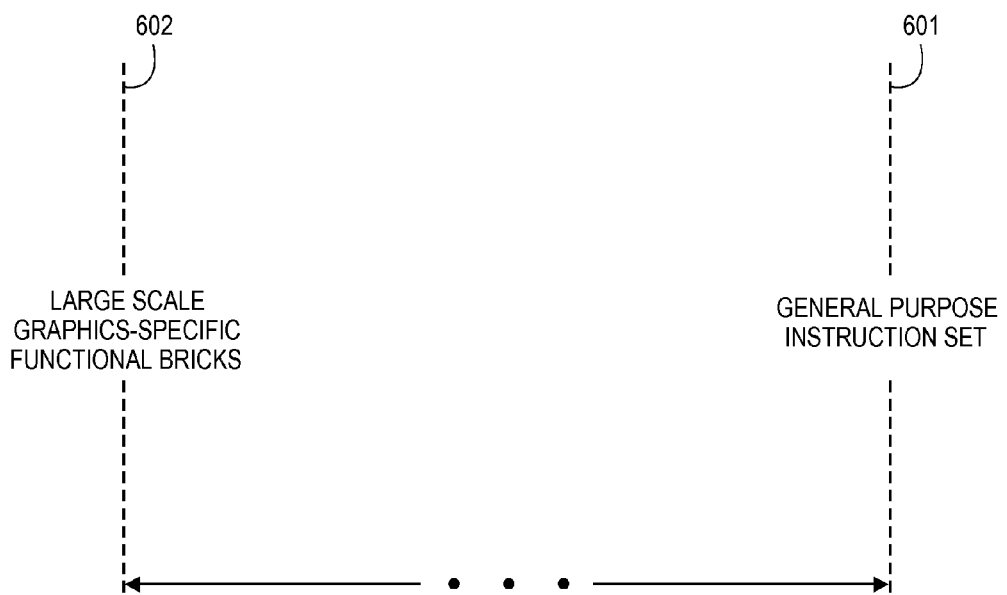
Figure 7:
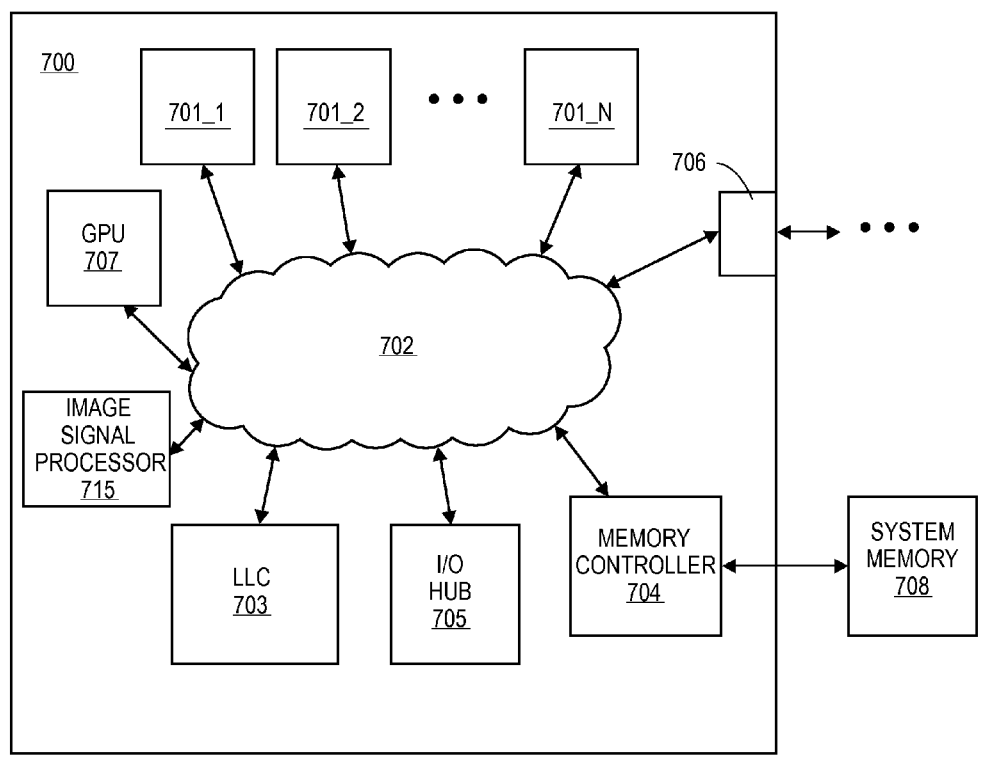
Figure 8:
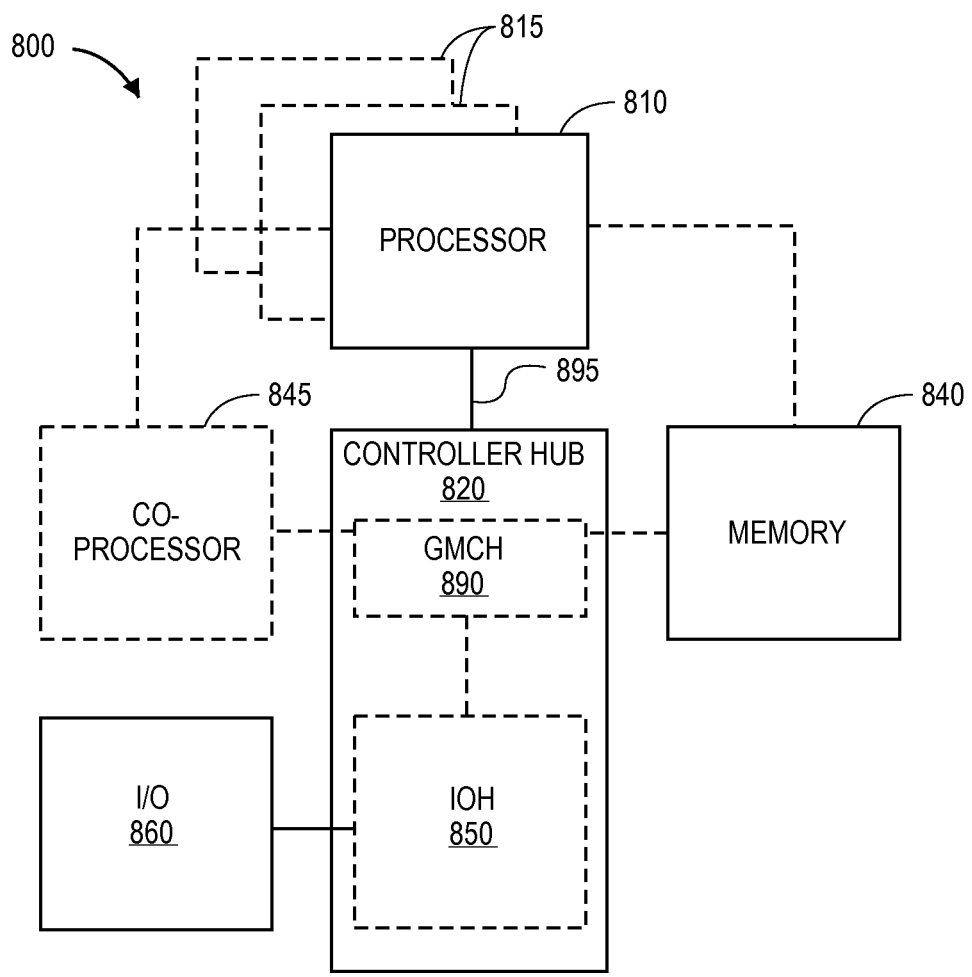
Figure 9:
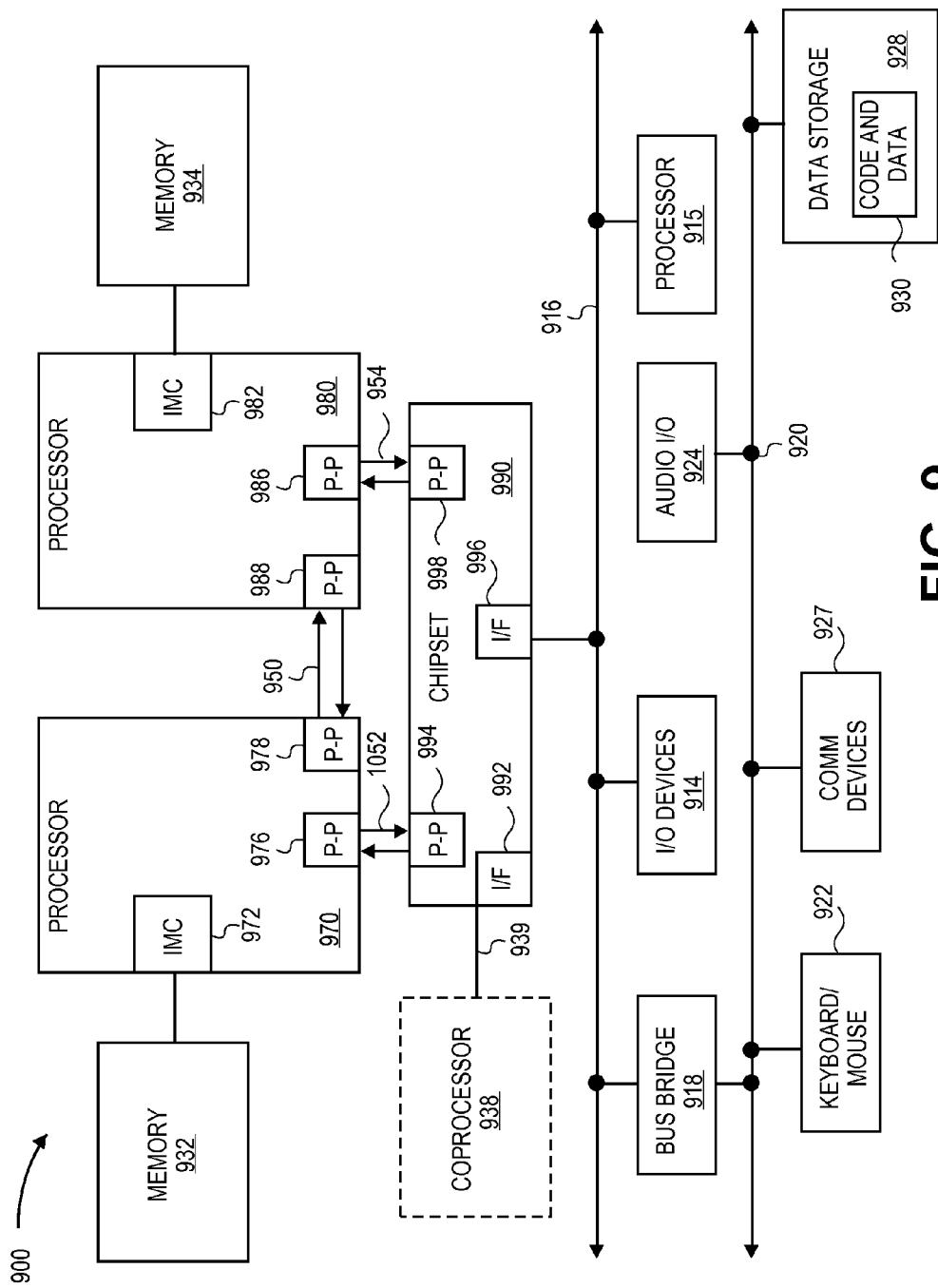
Figure 10:
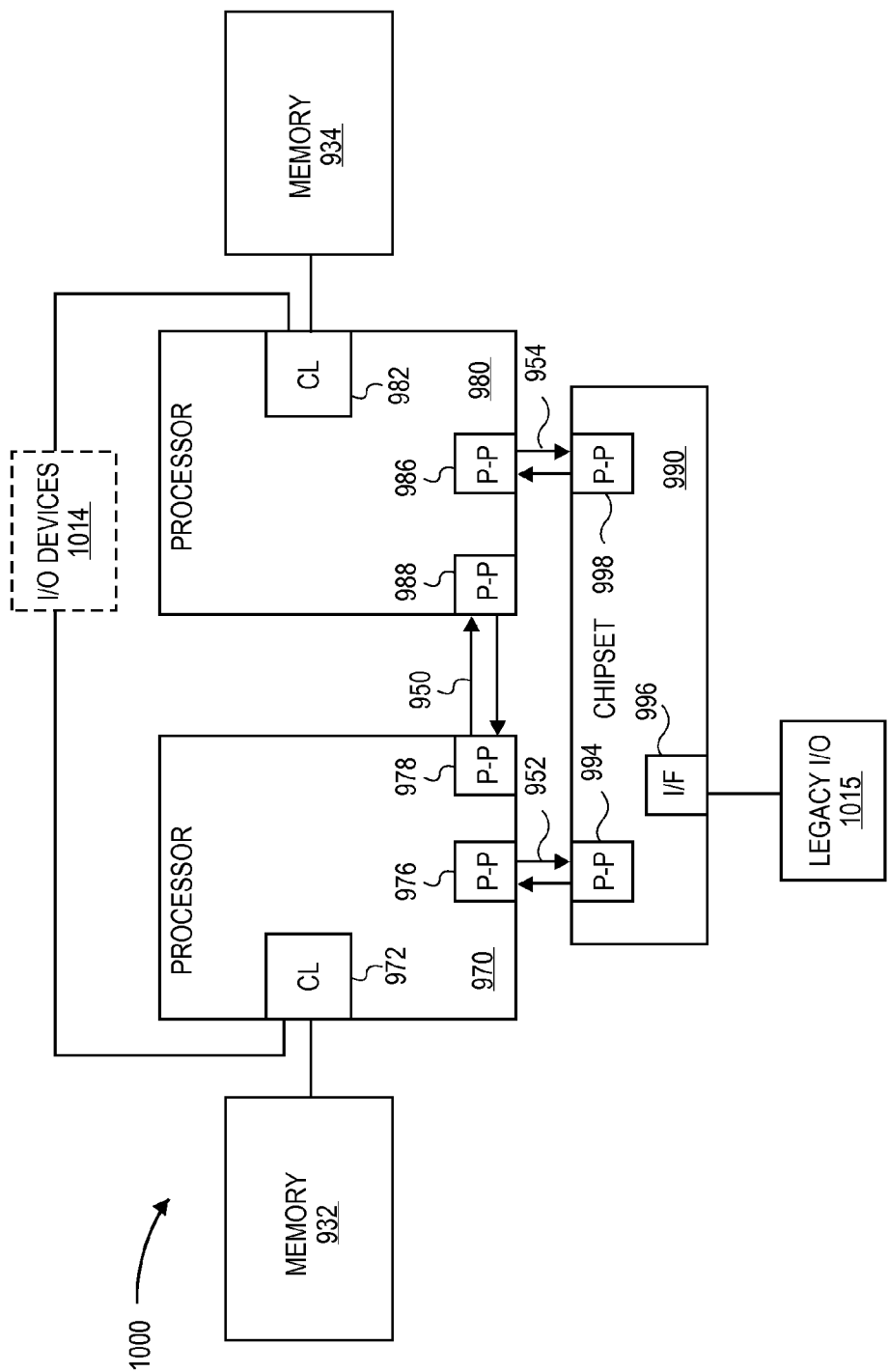
Figure 11:
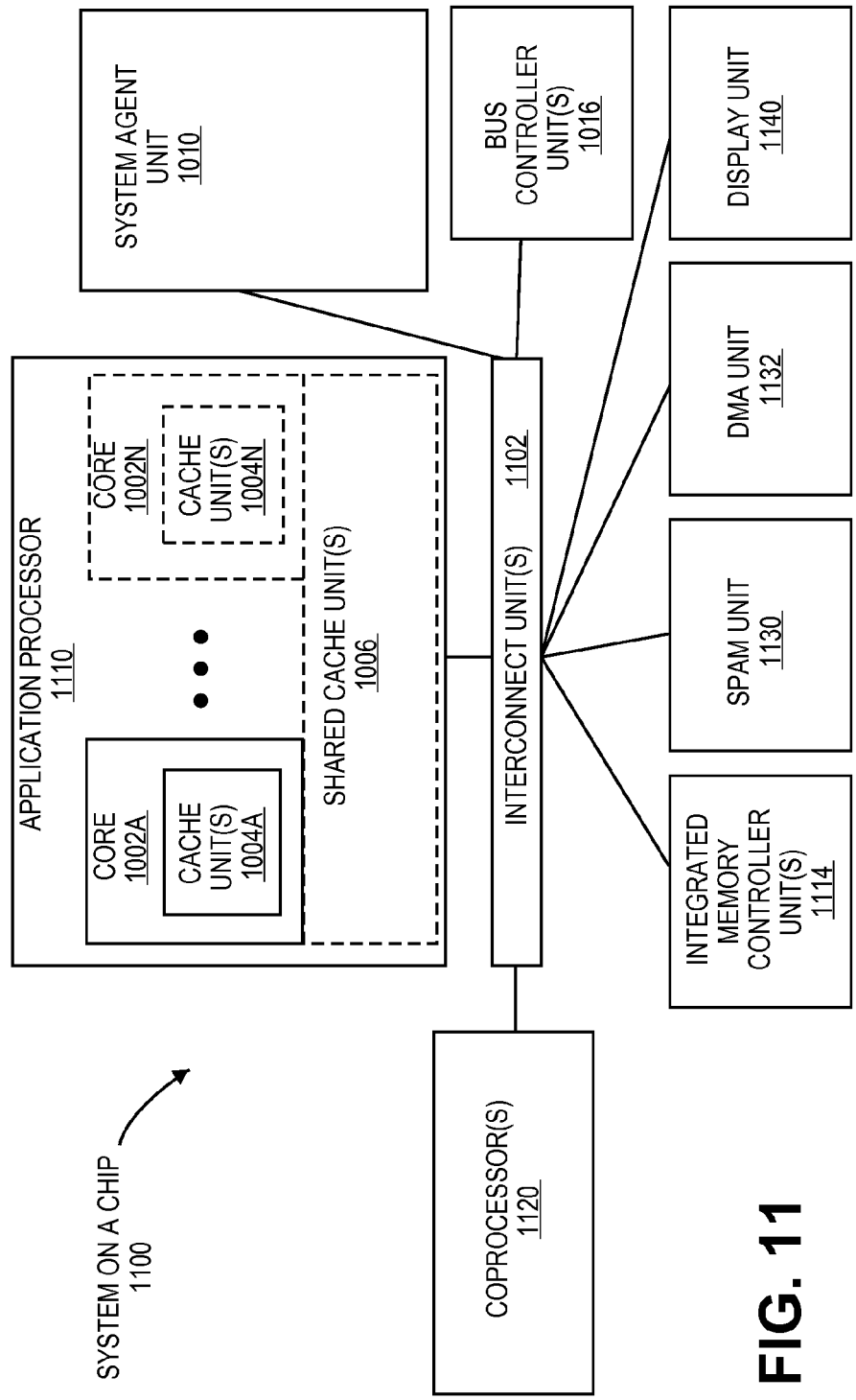
Figure 12:
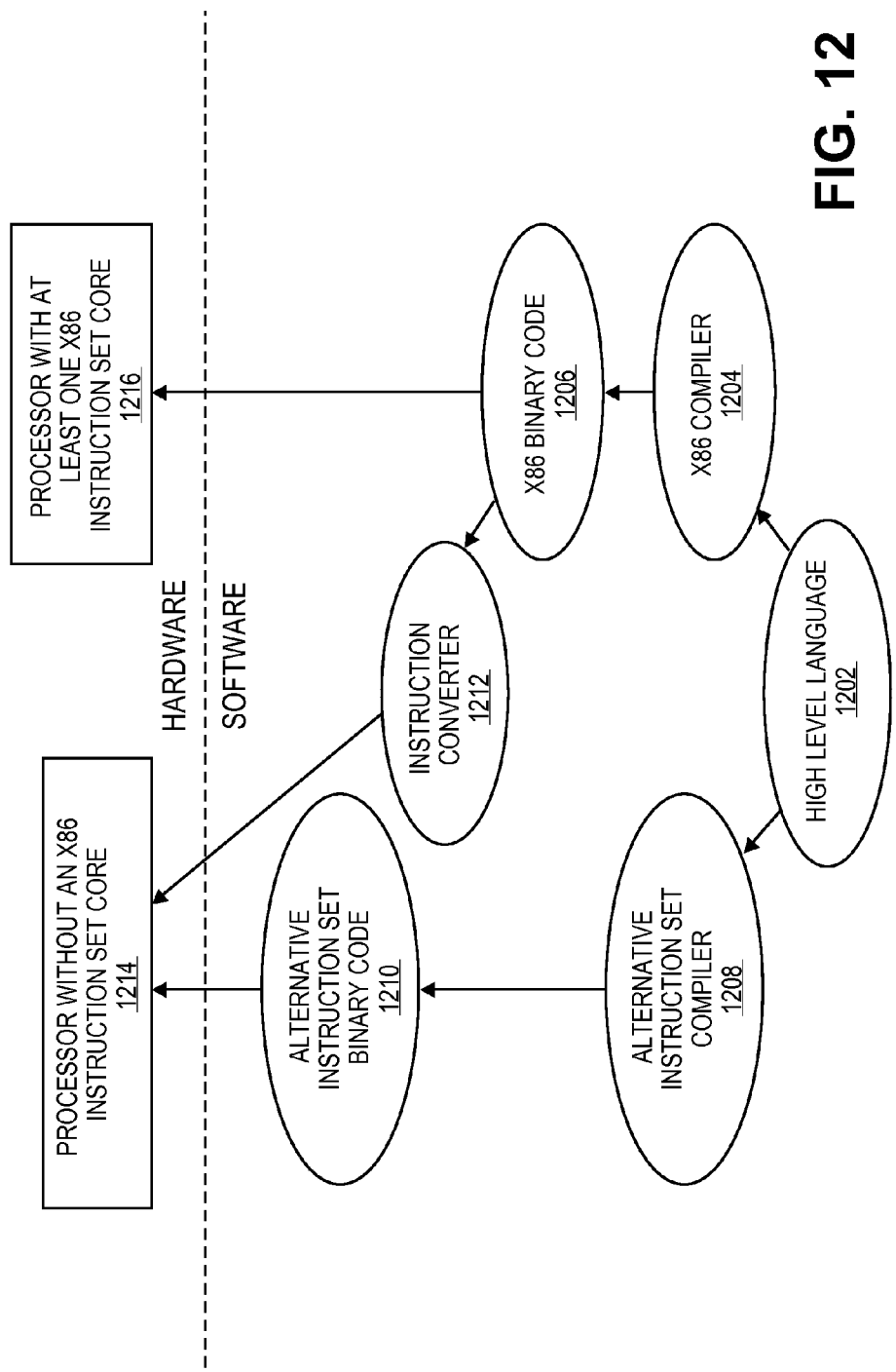

A better understanding of the present invention can be obtained from the following detailed description in conjunction with the following drawings, in which:

FIG. 1 shows a prior art image signal processor (prior art);
FIG. 2 shows an improved image signal processor;
FIG. 3a pertains to a first next neighbor embodiment;
FIG. 3b pertains to a second next neighbor embodiment;
FIG. 4 shows a methodology performed by a block checking circuit;
FIG. 5 shows a methodology performed by an image signal processor having a block checking circuit;
FIG. 6 shows two image signal processor architecture extremes;
FIG. 7 shows an embodiment of a multi-core processor;
FIG. 8 illustrates a block diagram of a system in accordance with one embodiment of the present invention;
FIG. 9 illustrates a block diagram of a second system in accordance with an embodiment of the present invention;
FIG. 10 illustrates a block diagram of a third system in accordance with an embodiment of the present invention;
FIG. 11 illustrates a block diagram of a system on a chip (SoC) in accordance with an embodiment of the present invention;
FIG. 12 illustrates a block diagram contrasting the use of a software instruction converter to convert binary instructions in a source instruction set to binary instructions in a target instruction set according to embodiments of the invention.

DETAILED DESCRIPTION

A problem with the prior art image signal processor is that the processing activity of the image signal processor 103 is intense requiring hundreds of clock cycles to fully process a block through all stages and consuming significant amounts of energy. The former (consumption of clock cycles) corresponds to latency issues (e.g., too much time is consumed between when an image is taken by the sensor and when it is stored and/or presented on the display), the later (consumption of significant amounts of energy) is troublesome for battery operated devices such as handheld devices.

FIG. 2 shows an improved design that takes advantage of repetitive luminosity patterns within the image frame to effectively eliminate processing by the image signal processor of entire blocks. As observed in FIG. 2, the improved design includes block identity check logic circuitry 205 (hereafter, "block check circuitry") that analyzes the patterns of luminosity values of individual blocks within an image frame 210 and flags when the luminosity pattern of a subsequent block to be processed has the same luminosity pattern of a block that was previously processed. As described in more detail below, in various embodiments, the same luminosity pattern means (all or a sufficient percentage of) same positioned pixels of two blocks have the same or comparable luminosity values.

In the case where a subsequent block's luminosity pattern is the same as a previous block's luminosity pattern, the image signal processor will save the output generated for the previous block and, rather than accept the subsequent block as a unit of input data and fully process it, instead, the image signal processor 203 will re-present the stored output results from the previous block as the output for the subsequent block. As such, there is not only a processing speed-up, but also an energy savings Here, note that the pattern of R, G and B pixels is the same across the blocks of the frame 210. That is, block 211 has the same pattern of R, G and B pixels as block 212 (for simplicity 2 pixel by 2 pixel blocks are shown but the same can easily be said for many blocks of other dimension). As such, it can be seen that any block has the same pattern of R, G, B pixels as any of its left, right, top or bottom neighboring blocks. Again, it should be understood that red, blue and green colors are only being used as an example and that other colors may just as easily be used. Additionally the specific pixel pattern observed in FIG. 2 is only exemplary (other pixel patterns can be used).

Because the pattern of R, G and B pixels amongst blocks is the same, if any two blocks have the same luminosity pattern across their respective pixels then the two blocks will essentially present the image signal processor 203 with the same input data which correspondingly will produce same output data. Therefore, once two blocks are identified as having same luminosity data, the image signal processor output for the first of the blocks can also be re-used as the output for the second of the blocks.

In operation, the block identity check circuitry 205 reads a block's luminosity values from a memory 202. In an embodiment these are stored internally (e.g., within register or memory space 206) within the block check circuitry 205. The block check circuitry 205 then reads another block's luminosity data. The just read luminosity values are then compared by comparison unit 230 against the internally stored values such that same positioned pixels within the two blocks are directly compared (i.e., a stored luminosity value from a particular pixel location is compared against a just read luminosity value from the same pixel location).

In an embodiment, if the two blocks have same luminosity values, the identity of both blocks are written into an entry 220 within a table 208 (e.g., within other register or memory space) within the block check circuitry 205 (the block checking circuitry naturally includes logic circuitry to write the entry contents into the table 208). Here, of the two identical blocks, a first location 221 in the entry 220 is reserved for an identifier of the block that will be processed earlier by the image signal processor based on its location within the frame (the first block) and a second location 222 in the entry is reserved for an identifier of the block that will be processed later by the image signal processor based on its location within the frame (the second block). As such, by reference to the first location 221 in the entry 220 the image signal processor will know to save the processing results for the first block, and, by reference to the second location 222 in the entry 220 the image signal processor will know to use these results when it is time to process the second block.

The image signal processor 203, in an embodiment, also has associated register or memory storage space 213 to store the output results from the processing of a block having a subsequent block with same luminosity values. In a typical embodiment, the pipeline "operates out of" a memory such as a system memory. For instance, the instructions executed by the pipeline and the data operated on the pipeline are stored in a system memory. Storage space 213 may correspond to the system memory in this approach. The frame 210 may also be stored in storage space 213.

Storage space 213 also keeps, along with the output values from the processing of a block 215, the identity of the block itself 217. As such, in one possible embodiment, when the pipeline 216 of the image signal processor refers 203 begins operations to process a next block, it initially looks to the contents of the table 208 within the check block circuitry 205 to see if there is an entry identifying the same block. If there is, the pipeline 216 will know to store the results in storage space 213 if the match is for a "previous" block, or, will know to provide storage results already existing in storage space 213 as an output if the match is for a "subsequent" block.

In an embodiment, the block check circuitry 215 "runs ahead" of the pipeline 216 so that the block check circuitry 205 will typically have processed a block for both "previous" and "subsequent" status before the pipeline 216 begins to process it. The block check circuitry 205 operates substantially independently of the image signal processor pipeline 216. Accordingly, the block check circuitry 205 can be deemed to operate substantially independently of the image signal processor pipeline 216.

In an embodiment, the block check circuitry 215 only considers "next neighboring" blocks relative to the block currently being processed by the block check circuitry 215. That is, the "subsequent" blocks considered for any potential "previous" block are only those blocks that neighbor the "previous" block and will be processed after it according to the order of blocks at which the pipeline 216 processes blocks.

FIG. 3a shows an example, according to the diagram of FIG. 3a, if the pipeline 216 processes blocks in order from left to right and moves down row by row, the "next neighboring" blocks of "previous" block 301 are "subsequent" blocks 302, 303, 304 and 305. By contrast, referring to FIG. 3b, if the pipeline 216 processes blocks in order from right to left and moves up row by row the "next neighboring" blocks of "previous" block 311 are "subsequent" blocks 312, 313, 314 and 315. In either case, blocks 302, 303, 304, 305/312, 313, 314 and 315 correspond to "subsequent" blocks that will be processed by the pipeline 216 after the "previous" block under consideration 301/311 is processed. In a specific implementation block 303 is not actually called in for processing as a subsequent block even though technically speaking it qualifies as such. The same can be said for block 313 in the example of FIG. 3b.

The block circuitry 205 accesses blocks from frame 210 in succession and records the existence of any "next neighboring" previous/subsequent block pairs having same luminosity values in register space 206 as described above. That is, if any matching subsequent "next neighboring" block is identified for a particular "previous" block, the appropriate entry is created in register space 206. After all next neighboring blocks for the previous block being processed are considered, the block check circuitry 205 moves onto the next block in the frame. The block checking circuitry 205 therefore has some built-in awareness of the pipeline's accessing pattern of the frame 210 so that it is able to determine the next neighboring blocks for each block in the array.

Thus, to more fully describe the operation of the block check circuit 205, a block of luminosity values are read and stored in storage space 206. Then one or more "subsequent" blocks of luminosity values are read and compared against the values stored in storage space 206 (wherein same positioned luminosity values of two different blocks are directly compared against one another). The one or more "subsequent" blocks may be, for instance, the next neighboring blocks discussed above with respect to FIGS. 3a and 3b. If any of these comparisons determine that any of the subsequent blocks match the block stored in storage space 206, an entry is created in table 208 that provides the identity of the block stored in storage space 206 as the previous block and the matching subsequent block as the subsequent block. The block check circuit 205 then repeats the process for the next block in the frame.

Limiting the search for a matching subsequent block (e.g., to next neighboring blocks) effectively limits the amount of storage space needed to implement the table 208 within the block checking circuit 205 as well as limits the storage space 213 within the image signal processor 203 used to keep previously calculated output values, while also, capturing the highest match probabilities (neighboring blocks tend to have a higher probability of matching). If the entire remainder of a frame were to be read and compared to the block under consideration, the likelihood of a match would in most cases decrease with each subsequent block that moves farther away from the block under consideration.

In an embodiment, the storage space used to keep table 208 is designed to hold less entries than the number of blocks in an array. As such, there can be cases where the storage space "fills up" for a particular frame before all the blocks within the frame are processed. As such, in an embodiment, the block checking circuit 205 is designed to confirm there is room in table 208 for another entry before processing a next block in the frame.

Limiting the search that is performed for any block under consideration, e.g., to only neighboring blocks, also limits the propagation delay between the start of the block checking circuit 205 and when the pipeline 216 can begin its processing. Generally, a block should be checked for both "previous" status and "subsequent" status by the block checking circuitry 205 before it is processed by the image signal processor pipeline 216. Where it otherwise, the pipeline 216 would begin to process a block before it was known whether the block's output is to be saved or whether output values for the block already reside in storage space 213.

Moreover, if the number of blocks to be considered for a match becomes too large, the pipeline 216 might have to wait for too long a time period before it can begin to process a block. For example in an extreme case, if all "subsequent" blocks in the array are to be analyzed by the block checking circuit for any particular block, the pipeline 216 would have to wait for the entire array to be processed by the block checking circuit 205 before the pipeline 216 could begin processing of the first block. Of course, this approach may be acceptable in some embodiments.

How much storage space is to be allocated within the block checking circuit for storage of the table 208, how much of storage space 213 is to be allocated to keep previously calculated output values, how much lead time the block checking circuit 205 is to be given and/or how many subsequent blocks are to be analyzed for a block under consideration (e.g., whether just neighboring next blocks or a wider range of non neighboring blocks) can vary widely from embodiment to embodiment as any/all of these parameters are essentially a design option choice.

In an embodiment, the block checking circuit 205 is designed to start processing blocks from a frame before the pipeline 216 begins to start processing blocks from the frame. Once the block checking circuit 205 has had time to process a number of blocks (e.g., as function of how expansive the search is) the pipeline 216 begins to access the first block in the frame for processing. Typically, because block checking by circuit 205 is faster than block processing by the pipeline 216, the pipeline 216 does not "catch up" to the block checking circuit 205 (i.e., does not begin access of a block before the block has been fully processed by the block checking circuit for matches within the array). To prevent losing the effect of block checking if such an occurrence is possible, the image signal processor 203 may be designed to prevent the pipeline 216 from receiving a block for processing until the block checking circuit 205 has had time to consider it as both a "previous" block and a "subsequent" block.

In this case, the pipeline 216 may be coupled to the block checking circuit 205 by way of access line 217. Here, access line 217 is coupled to register space or other circuitry of the block checking circuit 205 that specifies what block the block checking circuit is currently processing (e.g., as the "previous" block). Before beginning to process a next block in the array, the pipeline 216 will refer to the information from access line 217 and, if the pipeline 216 has caught up to the block checking circuit 205, the image signal processor will wait until access line 217 indicates that the block checking circuit has finished processing the block.

In typical embodiments, however, the pipeline is "guaranteed" not to catch up to the block checking circuit 205 by giving the block checking circuit 205 a sufficient head start, wherein, even under worst case circumstances (e.g., a match is found for every initial block processed), the image signal processor could never catch up to it.

The architecture of storage space 206 and comparison unit 230 can be replicated multiple times to check for matching blocks is a parallel fashion (e.g., a first instance processes a first group of frame rows while another instance processes another group of different frame rows). Each instance of this architecture may be coupled to the same table 208 so that only one record is used to keep track of the detected previous/subsequent matching block pairs.

Note that in certain embodiments there may be a consecutive string of matching blocks. For example, a block under consideration may match two or more of its subsequent blocks. In various embodiments, the structure of table 208 may be enhanced to list the identities of multiple matching blocks to conserve space in terms of the maximum number of entries that table 208 is designed to have.

Also, note that storage space 206 may be extended to include space not only for the current block under consideration but also the subsequent block that will be recognized as the next block under consideration. For example, referring to FIG. 3a, when block 301 is being processed as the block under consideration, the luminosity values of subsequent block 302 will be read from memory to be compared with the luminosity values of block 301 (which are stored in storage space 206). The luminosity values of block 302 may also be kept in storage space 206 (along with the luminosity values for block 301) while block 301 is being processed.

When the processing of block 301 is complete, block 302 is next in line to be processed as the block under consideration. As such, the luminosity values for block 302 that are in storage space 206 may be reused to perform the analysis for block 302. By so doing, the luminosity values for block 302 do not need to be read from memory 202 twice on two consecutive analytic passes thereby conserving memory bandwidth and power consumption. The luminosity values of block 301 within storage space 206 may then be put in a buffer that feeds the pipeline 216 (or may be provided to the pipeline 216 directly). If the identifier of block 301 is marked in table 208 as being a "subsequent" block of a previous/subsequent block pair, the luminosity values of block 301 do not need to be passed to the pipeline because the pipeline 216 will already have the output values for block 301 stored in storage space 213. Regardless, by pushing the luminosity values out of storage space 206, room is made in storage space to accept the next neighboring block of block 302 (block 306).

Additionally, once a block is stored in storage 206 it may remain there for all subsequently read blocks of the frame (so that it can be compared against any more remote (non-neighboring) blocks within the frame, may be "pushed out" on the immediately following block (e.g., storage 206 only has space for one block of pixels), or, the block may be treated somewhere between these two extremes (e.g., may remain in storage 206 for a number of subsequently considered blocks including remote ones from the block in storage and then eventually be pushed out).

Although the embodiments discussed above indicate that the block checking circuitry reads blocks from memory in the order that the pipeline processes them, this is not a strict requirement so long as the circuitry that writes into table 208 understands the order in which the pipeline processes the blocks. That is, a first block that is read by the checking circuit 205 before a second block may actually be processed by the pipeline 216 after the second block. So long as the circuitry that updates table 208 understands that the second block is to be entered in table 208 as the "previous" block and the first block is to be entered as the "subsequent" block as between the pair of blocks, the overall system will still work correctly.

In various embodiments the comparison process performed by the comparison unit 230 within the block checking circuitry seeks to find an identical match (i.e., all luminosity values for all pixels within the block are the same). In other embodiments, less stringent criteria for a match may be used. For example, a match may be found if some percentage (e.g., 85%, 90%, 95%, etc.) of pixels between the blocks being compared are identical. Separately or in combination, the luminosity values may be within some range of one another and a match may still be found (e.g., a luminosity value of a pixel of a block that will be processed after the block under consideration will be deemed a match if it is within 5%, 10%, etc. of a same positioned pixel within the block under consideration).

FIG. 4 shows a process performed by the block checking circuit. The block checking circuit advances to a next block for consideration as the previous block 401 and then advances to the next subsequent block 402 of the block under consideration. The block checking circuit then compares 403 the luminosity values of the block under consideration to the luminosity values of the next subsequent block. If there is a match 404 an entry is added 405 to a table that identifies the block under consideration as the previous block and the matching subsequent block. If there is no match, processes 402, 403 and 404 are performed for each subsequent block to be considered. The entire process then repeats for the next block to be under consideration 401. As entries within the table maintained by the block checking circuit outline their usefulness (the block processing progression of both the block checking circuit and the pipeline have advanced beyond both the previous and subsequent block IDs in the entry), they may be cleared from the table to make room for new entries.

FIG. 5 shows a process that may be performed by the (e.g., initial stage(s)) of the pipeline and/or by logic within the image signal processor generally. According to the methodology of FIG. 5, the pipeline advances to a next block to be processed 501. Before accepting the block's luminosity values, however, a check is made to see if there is an entry containing the identity of the next block to be processed 502 in the table that is maintained by the block checking circuitry. If there is no such entry, the pipeline processes the block's luminosity values and does not use the stored output resultant of another block nor store the block's output resultant 503.

If there is such an entry and the entry indicates that there will be a subsequent block having the same luminosity values as the current block (the block is recognized as a previous block), the pipeline processes the block's luminosity values and stores the resultant values (e.g., RGB signals) into storage space with an identifier of the block 504.

If there is such an entry and the entry indicates that a previous block was already processed having the same luminosity values as the current block, the pipeline extracts (with the identifier of the previously processed block) the output produced for the previously processed block and provides that output as the output for the current block 505.

FIG. 6 provides more details on the implementation of the pipeline of an image signal processor. At one extreme 601 the hardware component of the pipeline is implemented with the instruction set of a general purpose processing core (e.g., an x86 core, a standard ARM core, etc.). General purpose processing cores typically do not have instructions in their instruction set architectures designed to perform the highly specific tasks associated with image signal processing (e.g., demosaicing, noise reduction, image sharpening, etc.). As such the highly specific tasks are embodied as program code that are executed by the instruction execution pipeline(s) of one or more general purpose cores and their associated more generic instruction set architectures.

At the other extreme 602 the hardware component of the pipeline is implemented as various application-specific hardware blocks that are each specifically designed to execute a graphics-specific function (e.g., a Bayer transformation hardware block, a noise reduction hardware block, etc.) and that are called out as needed (e.g., a node reduction block is used if noise reduction is needed, an image sharpening block is used if image sharpening is needed, etc.). Here, the software code is typically less complex because the underlying hardware has been designed to support much larger scale image processing functional bricks.

In between these two extremes are various image signal processing architectures that may use a combination of these two extremes and/or employ the use of functional blocks that are more granularized than the functional bricks of extreme 602 but more graphics specific than the generalized instruction sets of extreme 601 (e.g., a Discrete Cosine Transformation (DCT) block, an Inverse Fourier Transform (IFT) block, etc.).

Note that the widely varied possible image signal processor implementations permit the image signal processor to be implemented in any of a general purpose processing core, a graphics processing unit, a stand-alone image signal processor (e.g., apart from the GPU and general purpose core(s)) on a system-on-chip (SOC), etc.

FIG. 7 shows the architecture of an exemplary multi-core processor 700. As observed in FIG. 7, the processor includes: 1) multiple general purpose processing cores 701_1 to 701_N; 2) an interconnection network 702; 3) a last level caching system 703; 4) a memory controller 704; 5) I/O hub 705; 6) a graphics processing unit 707. An image signal processor as described above may be implemented in any of the general purpose processing cores 701, the graphics processing unit 707 or as a stand alone image signal processor 715.

Each of the processing cores contains one or more instruction execution pipelines for executing program code instructions. The interconnect network 702 serves to interconnect each of the cores 701_1 to 701_N to each other as well as the other components 703, 704, 705. The last level caching system 703 serves as a last layer of cache in the processor before instructions and/or data are evicted to system memory 708.

The memory controller 704 reads/writes data and instructions from/to system memory 708. The I/O hub 705 manages communication between the processor and "I/O" devices (e.g., non volatile storage devices and/or network interfaces). Port 706 stems from the interconnection network 702 to link multiple processors so that systems having more than N cores can be realized. Graphics processor 707 performs graphics computations. Power management circuitry (not shown)

manages the performance and power states of the processor as a whole ("package level") as well as aspects of the performance and power states of the individual units within the processor such as the individual cores 701_1 to 701_N, graphics processor 707, etc. Other functional blocks of significance (e.g., phase locked loop (PLL) circuitry) are not depicted in FIG. 7 for convenience.

FIGS. 8 and 10 show block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 200.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

FIG. 9 shows a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 200. In one embodiment of the invention, processors 970 and 980 are respectively processors 810 and 815, while coprocessor 938 is coprocessor 845. In another embodiment, processors 970 and 980 are respectively processor 810 and coprocessor 945.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, CPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

FIG. 10 shows a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Referring now to FIG. 11, shown is a block diagram of a SoC 1100 in accordance with an embodiment of the present invention. Dashed lined boxes are optional features on more advanced SoCs. In FIG. 11, an interconnect unit(s) 1102 is coupled to: an application processor 1110 which includes a set of one or more cores 1101_1 through 1101_N with respective internal cache units 1104_1 through 1104_N and shared cache unit(s) 1106; a system agent unit 1110; a bus controller unit(s) 1116; an integrated memory controller unit(s) 1114; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 12 shows a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

From the foregoing, an image signal processor has been described. The image signal processor includes a block checking circuit. The block checking circuit comprises comparison circuitry to compare a block of luminous pixel values against respective blocks of luminous pixel values that are processed by the image signal processor after the block of luminous pixel values. The block checking circuitry further comprises circuitry to record an entry in a table if one of the blocks of respective luminous pixel values match the block of luminous pixel values. The image signal processor is to store an image signal processing resultant of the block of luminous pixel values and present the stored resultant as a respective resultant for the one of the blocks of respective luminous pixel values if the one of the blocks of respective luminous pixel values matches the block of pixel values.

From the foregoing a method has been described. The method includes comparing a block of luminous pixel values against respective blocks of luminous pixel values that are processed by an image signal processor after said block of luminous pixel values. The method includes recording an entry in a table if one of the blocks of respective luminous pixel values match the block of luminous pixel values. The method includes processing the block of luminous pixel values. If the one of the blocks of respective luminous pixel values match the block of luminous pixel values, then, the method includes storing a resultant of the processing and presenting the resultant as a resultant of corresponding processing for the one of the blocks of respective luminous pixel values.

From the foregoing a semiconductor chip has been described. The semiconductor chip includes an image signal processor. The image signal processor is implemented: i) as a stand alone functional block within the semiconductor chip; ii) within a graphics processing unit; or, iii) within a general purpose processing core. The image signal processor includes a block checking circuit. The block checking circuit comprises comparison circuitry to compare a block of luminous pixel values against respective blocks of luminous pixel values that are processed by the image signal processor after the block of luminous pixel values. The block checking circuitry further comprises circuitry to record an entry in a table if one of the blocks of respective luminous pixel values match the block of luminous pixel values. The image signal processor is to store an image signal processing resultant of the block of luminous pixel values and present the stored resultant as a respective resultant for the one of the blocks of respective luminous pixel values if the one of the blocks of respective luminous pixel values matches the block of pixel values.

What is claimed is:

1. An image signal processor comprising:
    a block checking circuit comprising:
        comparison circuitry to compare a block of luminous pixel values against respective blocks of luminous pixel values that are processed by said image signal processor after said block of luminous pixel values, and
        circuitry to record an entry in a table if one of said respective blocks of luminous pixel values is a match with said block of luminous pixel values; and
    circuitry to store an image signal processing resultant of said block of luminous pixel values and provide said image signal processing resultant as a respective image signal processing resultant for said one of said respective blocks of luminous pixel values if the entry in the table indicates that said one of said respective blocks of luminous pixel values matches said block of luminous pixel values.

2. The image signal processor of claim 1 wherein a pipeline is to process said block of luminous pixel values to create said image signal processing resultant.

3. The image signal processor of claim 2 wherein a hardware component of said pipeline is coupled to a storage resource where said image signal processing resultant is stored.

4. The image signal processor of claim 1 wherein said match is an exact match.

5. The image signal processor of claim 1 wherein said match is deemed when at least some percentage of luminous pixel values of said block match corresponding luminous pixel values of said one of said respective blocks.

6. The image signal processor of claim 1 wherein said match is deemed when each luminous pixel value of said block is within a range of a corresponding luminous pixel value of said one of said respective blocks.

7. The image signal processor of claim 1 wherein said respective blocks of luminous pixel values are adjacent to said block of luminous pixel values within a frame.

8. A method comprising:
    processing a block of luminous pixel values with an image signal processor;
    storing a resultant of said processing;
    comparing the block of luminous pixel values against respective blocks of luminous pixel values that are processed by the image signal processor after said block of luminous pixel values;
    recording an entry in a table if one of said respective blocks of luminous pixel values is a match with said block of luminous pixel values; and
    providing said resultant as a corresponding resultant for said one of said respective blocks of luminous pixel values if the entry in the table indicates that said one of said respective blocks of luminous pixel values matches said block of luminous pixel values.

9. The method of claim 8 wherein said processing is performed with a pipeline.

10. The method of claim 8 wherein said match is an exact match.

11. The method of claim 8 wherein said match is deemed when at least some percentage of luminous pixel values of said block match corresponding luminous pixel values of said one of said respective blocks.

12. The method of claim 8 wherein said match is deemed when each luminous pixel value is within a range of a corresponding luminous pixel value of said one of said respective blocks.

13. The method of claim 8 wherein said respective blocks of luminous pixel values are adjacent to said block of luminous pixel values within a frame.

14. A semiconductor chip comprising:
    a general purpose processing core; and
    an image signal processor comprising:
        a block checking circuit comprising:
            comparison circuitry to compare a block of luminous pixel values against respective blocks of luminous pixel values that are processed by said image signal processor after said block of luminous pixel values, and circuitry to record an entry in a table if one of said respective blocks of luminous pixel values is a match with said block of luminous pixel values, and circuitry to store an image signal processing resultant of said block of luminous pixel values and provide said image signal processing resultant as a respective image signal processing resultant for said one of said respective blocks of luminous pixel values if the entry in the table indicates that said one of said respective blocks of luminous pixel values matches said block of luminous pixel values.

15. The semiconductor chip of claim 14 wherein a pipeline is to process said block of luminous pixel values to create said image signal processing resultant.

16. The semiconductor chip of claim 15 wherein a hardware component of said pipeline is coupled to a storage resource where said image signal processing resultant is stored.

17. The semiconductor chip of claim 14 wherein said match is an exact match.

18. The semiconductor chip of claim 14 wherein said match is deemed when at least some percentage of luminous pixel values of said block match corresponding luminous pixel values of said one of said respective blocks.

19. The semiconductor chip of claim 14 wherein said match is deemed when each luminous pixel value of said block is within a range of a corresponding luminous pixel value of said one of said respective blocks.

20. The semiconductor chip of claim 14 wherein said respective blocks of luminous pixel values are adjacent to said block of luminous pixel values within a frame.

\* \* \* \* \*